United States Patent
Youk et al.

(10) Patent No.: US 11,385,749 B2
(45) Date of Patent: Jul. 12, 2022

(54) TOUCH DISPLAY DEVICE

(71) Applicant: LG Display Co., Ltd., Seoul (KR)

(72) Inventors: Seung-Hyun Youk, Paju-si (KR); Min-Joo Kim, Seoul (KR); Sang-Hyuk Won, Gimpo-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/136,449

(22) Filed: Dec. 29, 2020

(65) Prior Publication Data
US 2021/0200379 A1     Jul. 1, 2021

(30) Foreign Application Priority Data
Dec. 31, 2019   (KR) .................. 10-2019-0179869

(51) Int. Cl.
*G06F 3/044*     (2006.01)
*H01Q 1/22*      (2006.01)
*G06F 3/041*     (2006.01)

(52) U.S. Cl.
CPC .......... *G06F 3/0445* (2019.05); *G06F 3/0412* (2013.01); *G06F 3/0448* (2019.05); *H01Q 1/2266* (2013.01); *G06F 2203/04103* (2013.01); *G06F 2203/04112* (2013.01)

(58) Field of Classification Search
CPC .... G06F 3/0445; G06F 3/0412; G06F 3/0448; G06F 2203/04103; G06F 2203/04112; G06F 3/0443; G06F 3/0446; G06F 3/044; G06F 2203/04111; H01Q 1/2266; H01Q 1/38; H01Q 1/243
See application file for complete search history.

(56) References Cited

U.S. PATENT DOCUMENTS

2002/0152606 A1* 10/2002 Huang .............. H01Q 1/38 29/601
2012/0019419 A1*  1/2012 Prat ............... H01Q 13/106 343/702
2016/0188092 A1*  6/2016 Sebastian ........... G06F 3/045 345/174

FOREIGN PATENT DOCUMENTS

KR    10-2019-0069226 A    6/2019

* cited by examiner

*Primary Examiner* — Sahlu Okebato
(74) *Attorney, Agent, or Firm* — Birch, Stewart, Kolasch & Birch, LLP (57) ABSTRACT

Discussed is a touch display device having an antenna disposed in a panel, thereby improving product reliability while reducing manufacturing cost. The touch display device includes a display unit including a plurality of pixels disposed in an active area, an encapsulation unit disposed on the display unit, the encapsulation unit being configured to seal the plurality of pixels, a touch sensor unit including a plurality of touch sensors disposed on the encapsulation unit, an antenna pattern disposed at an edge on the touch sensor unit in the state in which a planarization layer is interposed therebetween, the antenna pattern not overlapping a touch electrode and a touch routing line included in the touch sensor unit, and a ground plane disposed in an identical layer to any one metal layer belonging to the display unit, the ground plane overlapping the antenna pattern.

12 Claims, 10 Drawing Sheets

TOUCH DISPLAY DEVICE

CROSS-REFERENCE TO RELATED APPLICATION(S)

This application claims the benefit of the Korean Patent Application No. 10-2019-0179869, filed in the Republic of Korea on Dec. 31, 2019, the entire contents of which are hereby expressly incorporated by reference in its entirety into the present application.

BACKGROUND

Technical Field

The present disclosure relates to a touch display device having an antenna disposed in a panel, thereby improving product reliability while reducing manufacturing cost.

Description of the Related Art

A touch sensor configured to allow information to be input by a user touch on the screen of a display is applied to various display devices, such as laptop computers, monitors, and electric home appliances, as well as portable information devices, such as smartphones and tablets.

Although a touch sensor is generally manufactured in the form of a touch panel, which is attached to a display panel, development has been conducted toward a system in which the touch sensor is mounted in the display panel in order to simplify the display device and reduce manufacturing cost.

There is a necessity for a display device having a touch sensor mounted therein that is capable of improving product reliability while reducing manufacturing cost.

BRIEF SUMMARY OF THE DISCLOSURE

Accordingly, the present disclosure is directed to a touch display device that substantially obviates one or more problems due to limitations and disadvantages of the related art.

One or more embodiments of the present disclosure provides a touch display device having an antenna disposed in a panel, thereby improving product reliability while reducing manufacturing cost.

Additional advantages, objects, and features of the disclosure will be set forth in part in the description which follows and in part will become apparent to those having ordinary skill in the art upon examination of the following or can be learned from practice of the disclosure. The objectives and other advantages of the disclosure can be realized and attained by the structure particularly pointed out in the written description and claims hereof as well as the appended drawings.

A touch display device according to an embodiment includes an antenna pattern disposed on a touch sensor unit in the state in which a planarization layer is interposed therebetween and a ground plane (a ground pattern) disposed in an identical layer to any one metal layer belonging to a display unit, the ground plane overlapping the antenna pattern.

In another aspect of the present disclosure, a touch display device includes a display unit including a plurality of pixels disposed in an active area, an encapsulation unit disposed on the display unit, the encapsulation unit being configured to seal the plurality of pixels, a touch sensor unit including a plurality of touch sensors disposed on the encapsulation unit, an antenna pattern disposed at an edge on the touch sensor unit in the state in which a planarization layer is interposed therebetween, the antenna pattern not overlapping a touch electrode and a touch routing line included in the touch sensor unit, and a ground plane disposed in an identical layer to any one metal layer belonging to the display unit, the ground plane overlapping the antenna pattern.

The antenna pattern can include a plurality of radiation patterns disposed in the active area on the planarization layer so as to be spaced apart from the touch electrode by a minimum distance and a feeding unit disposed on the planarization layer in a bezel area adjacent to the active area, the feeding unit being commonly connected to the plurality of radiation patterns, wherein the feeding unit can overlap the ground plane disposed in the bezel area in the display unit.

The touch sensor unit can include a plurality of touch electrodes disposed in the active area, a touch electrode adjacent to the antenna pattern, among the plurality of touch electrodes, can be a different-shaped touch electrode having a different shape from the other touch electrodes, and the different-shaped touch electrode can include an upper touch electrode and a lower touch electrode connected to each other via a contact hole.

Each of the radiation patterns can have a mesh pattern shape overlapping non-emissive areas of the plurality of pixels of the display unit.

The plurality of radiation patterns can be individually spaced apart from a plurality of different-shaped touch electrodes adjacent to the bezel area in the active area.

The planarization layer can be disposed only between the touch sensor unit and the antenna pattern.

The touch sensor unit can include a touch buffer layer, a bridge metal layer, a touch insulating layer, a sensor metal layer, and a touch passivation layer sequentially stacked on the encapsulation unit. The sensor metal layer can include first and second touch electrodes constituting each touch sensor, a second bridge electrode configured to interconnect adjacent second touch electrodes, the upper touch electrode of the different-shaped touch electrode, and a plurality of touch routing lines connected to the first and second touch electrodes. The bridge metal layer can include a first bridge electrode configured to interconnect adjacent first touch electrodes and the lower touch electrode of the different-shaped touch electrode. The first bridge electrode can partially overlap the second touch electrode or the second bridge electrode in the state in which the touch insulating layer is interposed therebetween. The first touch electrode, the second touch electrode, the different-shaped touch electrode, and at least one of the first bridge electrode and the second bridge electrode can have a mesh pattern shape overlapping the non-emissive areas of the plurality of pixels.

The touch routing lines can be disposed in bezel areas other than a bezel area in which the antenna pattern is located.

A plurality of insulating layers at least including the touch passivation layer and the planarization layer can be located between the ground plane and the antenna pattern in the bezel area.

The upper and lower touch electrodes can be connected to each other via a contact hole formed in the touch insulating layer, and the lower touch electrode can be connected to the first bridge electrode.

Each of the radiation patterns can include at least two edges opposite two edges of the different-shaped touch electrode, and the at least two edges of each of the radiation patterns can be disposed so as to be parallel to or so as not to be parallel to the two edges of the different-shaped touch electrode.

The minimum distance between each of the radiation patterns and the different-shaped touch electrode can be 550 μm or more and can be less than the diagonal length of each of the other touch electrodes.

The width of each of the radiation patterns can be greater than the minimum distance and can be greater than a width of the different-shaped touch electrode.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE EMBODIMENTS

Figure 1:
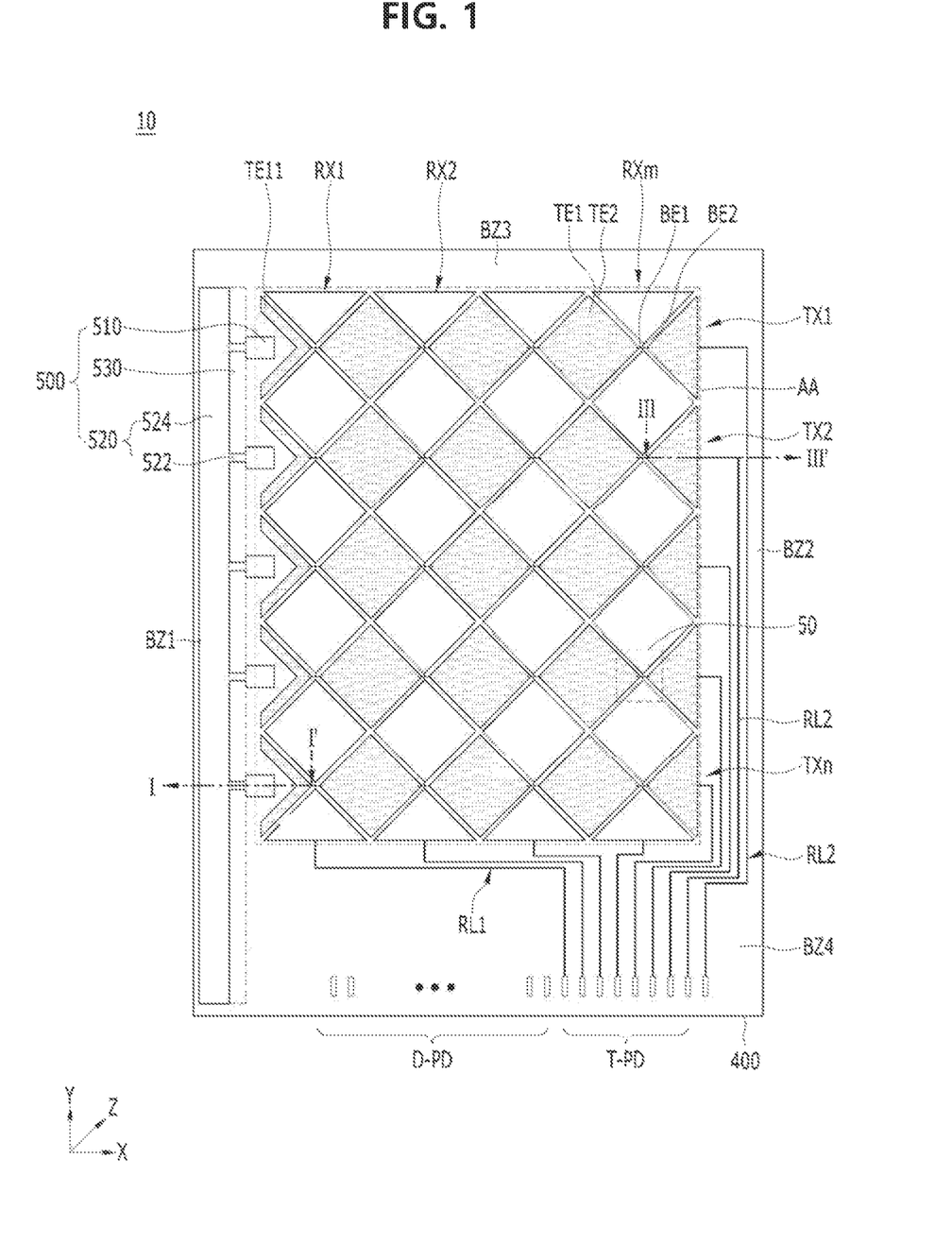
FIG. 1 is a plan view of a touch display device according to an embodiment.
Figure 2:
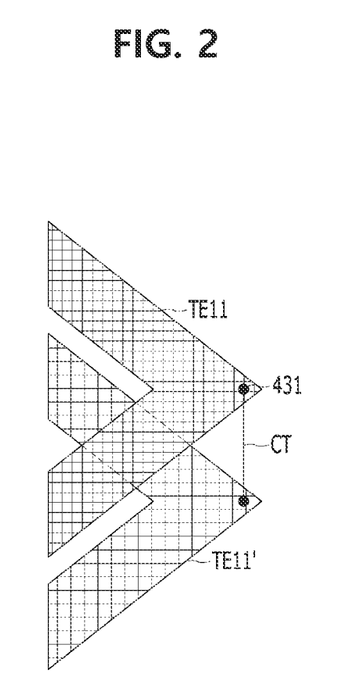
FIG. 2 is an enlarged view of a different-shaped touch electrode according to an embodiment.
Figure 3:
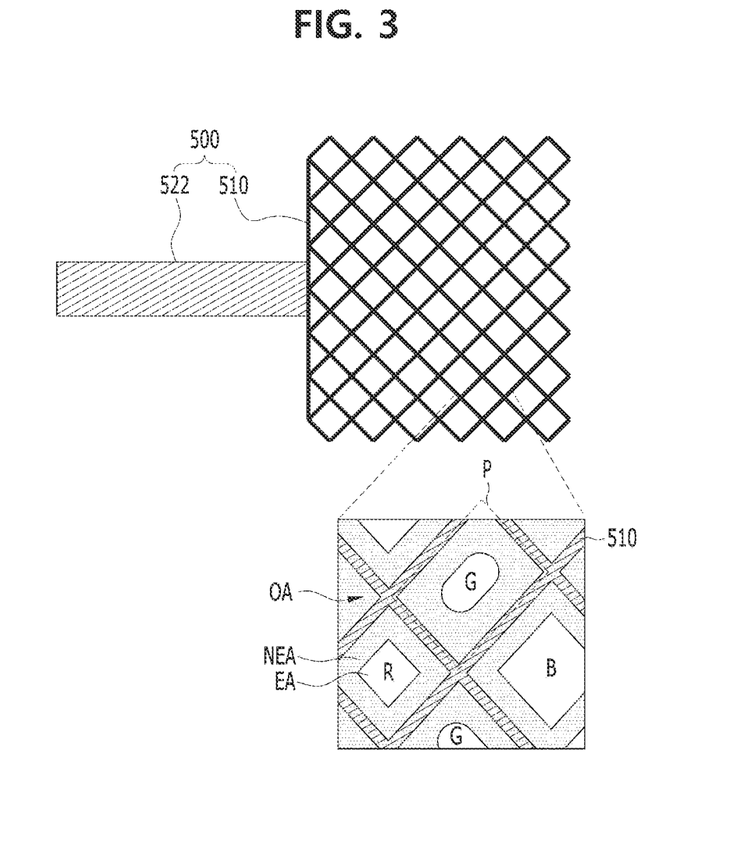
FIG. 3 is an enlarged plan view of an antenna pattern according to an embodiment.

FIG. 1 is a plan view of a touch display device according to an embodiment, FIG. 2 is an enlarged view of a different-shaped touch electrode according to an embodiment, and FIG. 3 is an enlarged plan view of an antenna pattern according to an embodiment. All the components of the touch display device according to all embodiments of the present disclosure are operatively coupled and configured.

Referring to FIG. 1, a touch display device 10 according to the embodiment includes an active area AA having image display and touch sensing functions and bezel areas BZ1 to BZ4 located outside the active area AA. The active area AA can be referred to as a display area, a pixel matrix area, or a touch sensing area. Each of the bezel areas BZ1 to BZ4 can be referred to as a non-active area, a non-display area, or a touch non-sensing area.

The touch display device 10 has a panel structure including a display unit configured such that a circuit device layer including a plurality of thin film transistors (TFTs) and a light-emitting element layer including a plurality of light-emitting elements are stacked in order to display an image, an encapsulation unit disposed on the display unit so as to seal the light-emitting element layer, a touch sensor unit disposed on the encapsulation unit, the touch sensor unit having a touch sensing function, and a patch type antenna unit(antenna pattern) 500 disposed at the edge of a panel, e.g., at the edge on the touch sensor unit.

The touch display device 10 can further include an optically functional film including a polarizing film attached to the touch sensor unit, on which the antenna unit is disposed, an optically clear adhesive (OCA), a cover substrate, and a protective film.

A pixel array including a plurality of pixels configured to display an image and a plurality of wires is disposed in an active area AA of the display unit. The plurality of pixels includes a red pixel, a green pixel, and a blue pixel, and can further include a white pixel configured to improve luminance. Each pixel is connected to a plurality of signal lines including a gate line, a data line, and a power line. Each pixel includes a light-emitting element and a pixel circuit configured to independently drive the light-emitting element. An organic light-emitting diode, a quantum-dot light-emitting diode, or an inorganic light-emitting diode can be used as the light-emitting element. Hereinafter, the organic light-emitting diode will be described by way of example. The pixel circuit can include a plurality of TFTs, at least including a drive TFT and a switching TFT, and a storage capacitor. The display unit has a structure in which a circuit element layer including a plurality of pixel circuits disposed in the active area and a light-emitting element layer including a plurality of light-emitting elements disposed in the active area are stacked.

A circuit element layer including a plurality of signal lines and a plurality of display pads D-PD connected to the active area is located in the bezel areas of the display unit. The signal lines in the bezel areas BZ1 to BZ4 can include link lines and power supply lines connected to the signal lines in the active area AA. A plurality of display pads D-PD configured to interconnect the signal lines of the bezel area BZ4 and a display drive unit is disposed in a pad area provided at one side of the bezel area BZ4. Meanwhile, the display unit can include lower pads of the display pads D-PD and can have a structure in which the display unit is connected to upper pads disposed on the touch sensor unit, a description of which will follow.

A gate drive unit configured to drive the plurality of gate lines in the active area AA can be disposed in one side bezel area BZ1 or opposite side bezel areas BZ2 of the bezel areas of the display unit. The gate drive unit, which includes a plurality of TFTs, can be formed in the circuit element layer together with the TFT array in the active area AA. The gate drive unit can receive control signals from the display drive unit via wires and the display pads D-PD disposed in the bezel area BZi (i=1, 2, 3, and 4).

The display drive unit can be mounted on the pad area in which the display pads D-PD are located or on a circuit film, and can be connected to the display pads D-PD via an anisotropic conductive film. The circuit film can be one of a chip on film (COF), a flexible printed circuit (FPC), and a flexible flat cable (FFC). The display drive unit can include a timing controller, a gamma voltage generation unit, and a data drive unit.

The encapsulation unit disposed on the display unit can overlap the entirety of the active area AA, can extend to the bezel areas BZ1 to BZ4, and can be disposed so as to overlap a dam unit disposed in the bezel areas BZ1 to BZ4. The encapsulation unit can protect the light-emitting element layer of the display unit by sealing. The encapsulation unit can include a structure in which a plurality of inorganic encapsulation layers configured to prevent the permeation of moisture and oxygen and at least one organic encapsulation layer configured to prevent the introduction or movement of particles are stacked. The encapsulation unit has a structure in which an organic encapsulation layer having a large thickness sufficient to cover particles is disposed between inorganic encapsulation layers having a small thickness. The organic encapsulation layer can also be referred to as a particle cover layer (PCL).

The dam unit can be disposed in the bezel areas BZ1 to BZ4 to restrict the end of the organic encapsulation layer of the encapsulation unit and thus to prevent downward flow or collapse of the encapsulation unit. For example, the dam unit can include a plurality of closed loop-shaped dams configured to surround the active area AA of the display unit and an area including the gate drive unit.

The touch sensor unit on the encapsulation unit can use a capacitance scheme in which a signal having capacitance variation by user touch reflected therein is provided to a touch drive unit. The touch sensor unit can use a self-capacitance scheme in which a signal having capacitance variation of each touch electrode reflected therein is independently provided to the touch drive unit or a mutual-capacitance scheme in which a signal having capacitance variation between first and second touch electrodes reflected therein is provided to the touch drive unit.

For example, each of the plurality of touch electrodes constituting the self-capacitance type touch sensor unit includes capacitance formed therein and thus is used as a self-capacitance touch sensor configured to sense a change in capacitance by user touch. The plurality of touch electrodes is individually connected to the plurality of touch lines. For example, each of the plurality of touch electrodes is electrically connected to one of the plurality of touch lines intersecting the touch electrodes, and is electrically isolated from the other touch lines. For example, an m-th (i.e., $m^{th}$) touch electrode (m being a natural number) is electrically connected to an m-th touch line through at least one touch contact hole, and is electrically isolated from the other touch lines excluding the m-th touch line. An (m+1)-th (i.e., $(m+1)^{th}$) touch electrode is electrically connected to an (m+1)-th touch line through at least one touch contact hole, and is electrically isolated from the other touch lines excluding the (m+1)-th touch line. Here, the touch electrode and the touch line can be formed on different layers in the state in which a touch insulating layer is interposed therebetween, and can be connected to each other via a contact hole formed through the touch insulating layer.

In the following embodiments, a mutual-capacitance type touch sensor unit will be described by way of example.

The touch sensor unit includes a plurality of touch electrodes TE1 and TE2 and a plurality of bridge electrodes BE1 and BE2 disposed in the active area AA to provide capacitance type touch sensors. The touch sensor unit includes a plurality of touch routing lines RL1 and RL2 and a plurality of touch pads T-PD disposed in the bezel areas BZ2 and BZ4. When the touch sensor unit is formed, the upper pads of the display pads D-PD can be formed of the same metal material in the same layer as upper pads of the touch pads T-PD, or can be formed of the same metal material in the same layer as the touch electrodes TE1 and TE2.

The touch sensor unit includes a plurality of first touch electrode channels TX1 to TXn constituted by a plurality of first touch electrodes TE1 electrically connected to each other while being arranged in the active area AA in a first direction (e.g., an X-axis direction or a horizontal direction) and a plurality of second touch electrode channels RX1 to RXm constituted by a plurality of second touch electrodes TE2 electrically connected to each other while being arranged in the active area AA in a second direction (e.g., a Y-axis direction or a vertical direction). A first touch electrode TE1 and a second touch electrode TE2 adjacent to each other can constitute a mutual-capacitance type touch sensor.

Each of the first touch electrodes TE1 arranged in the first direction X in each first touch electrode channel TXi (i=1 to n, where n can be a positive number such as a positive integer) is connected to a first touch electrode TE1 adjacent thereto via a first bridge electrode BE1. Each of the second touch electrodes TE2 arranged in the second direction Y in each second touch electrode channel RXi (i=1 to m, where m can be a positive number such as a positive integer) is connected to a second touch electrode TE2 adjacent thereto via a second bridge electrode BE2. The first touch electrodes TE1 can be referred to as transmission electrodes Tx, and the second touch electrodes TE2 can be referred to as reception electrodes Rx. The first touch electrode channels TX1 to TXn can be referred to as transmission channels, and the second touch electrode channels RX1 to RXm can be referred to as reception channels or readout channels.

Each of the first and second touch electrodes TE1 and TE2 can be formed so as to have a diamond shape, and each of the first and second touch electrodes TE1 and TE2 in the active area AA located adjacent to the second to fourth bezel areas BZ2, BZ3, and BZ4 can be formed so as to have an isosceles triangle shape. Each of a plurality of different-shaped touch electrodes TE11 disposed adjacent to the bezel area BZ1 in which an antenna unit 500 is disposed can be formed so as to have a boomerang shape spaced apart from a radiation pattern 510 of the antenna unit 500. Alternatively, each of the first and second touch electrodes TE1 and TE2 can be formed so as to have any of various other polygonal shapes.

Referring to FIG. 2, the different-shaped touch electrode TE11 can be formed in a different-shaped touch electrode structure in which an upper touch electrode TE11 and a lower touch electrode TE11', which have the same shape, are disposed so as to overlap each other in the state in which a touch insulating layer is interposed therebetween and are connected to each other via a contact unit CT extending via a contact hole formed in the touch insulating layer. The upper touch electrode TE11 can be formed of the same metal layer as a sensor metal layer, a description of which will follow, and the lower touch electrode TE11' can be formed of the same metal layer as a bridge metal layer, a description of which will follow, and can connected to a first bridge electrode formed of the bridge metal layer. Consequently, the resistance of the different-shaped touch electrode TE11, which has a smaller planar area than the other touch electrodes TE1 and TE2, can be reduced, whereby it is possible to minimize deviation in RC delay with other touch electrodes TE1 and TE2 and thus to prevent deterioration in touch sensing performance.

The plurality of touch routing lines RL1 and RL2, connected to the touch electrode channels TX1 to TXn and RX1 to RXm in the active area AA, and the plurality of touch pads T-PD, connected to the plurality of touch routing lines RL1 and RL2, can be disposed in the bezel areas BZ2 and BZ4 of the touch sensor unit. The plurality of touch routing lines RL1 and RL2 can overlap the encapsulation unit in the bezel areas BZ2 and BZ4. The touch drive unit can be mounted on a circuit film, and can be connected to the touch pads T-PD disposed in the bezel area BZ4 via an anisotropic conductive film.

One-side ends of the plurality of second touch electrode channels RX1 to RXm disposed in the active area AA can be connected to the touch drive unit via the plurality of first touch routing lines RL1 and the touch pads T-PD disposed in the bezel area BZ4. The plurality of first touch routing lines RL1 can be individually connected to the touch pads T-PD disposed at the lower end of the bezel area BZ4 via the bezel area BZ4.

One-side ends of the plurality of first touch electrode channels TX1 to TXn disposed in the active area AA can be connected to the touch drive unit via the plurality of second touch routing lines RL2 and the touch pads T-PD disposed in the bezel areas BZ2 and BZ4. The plurality of second touch routing lines RL2 can be individually connected to the touch pads T-PD disposed in the bezel area BZ4 via the bezel areas BZ2 and BZ4.

The touch drive unit can drive the plurality of first touch electrode channels TX1 to TXn, can receive readout signals output from the plurality of second touch electrode channels RX1 to RXm, and can generate touch sensing data using the readout signals. For example, the touch drive unit can compare readout signals of two adjacent channels through a differential amplifier to generate a touch sensing signal indicating whether touch has been performed, can digitally convert the touch sensing signal into touch sensing data, and can output the touch sensing data to a touch controller. The touch controller can detect touch coordinates of the touch area based on the touch sensing data, and can provide the same to a host system.

The antenna unit 500 can include a plurality of radiation patterns 510 disposed in the active area AA on the touch sensor unit, a feeding unit 520 disposed in the bezel area BZ1 on the touch sensor unit and commonly connected to the plurality of radiation patterns 510, and a ground plane 530 disposed in the display unit having a gap in a Z-axis direction while overlapping the feeding unit 520 in the bezel area BZ1.

Each of the plurality of radiation patterns 510 configured to transmit and receive wireless signals can be disposed in the active area AA so as to be individually spaced apart from a corresponding one of the plurality of different-shaped touch electrodes TE11 of the first touch electrode channel TX1 adjacent to the bezel area BZ1 in the active area AA on the touch sensor unit. Each of the radiation patterns 510 can extend to the bezel area BZ1 adjacent to the active area AA.

Referring to FIG. 3, the radiation pattern 510 disposed in the active area AA can have a mesh pattern shape overlapping a non-emissive area NEA of each pixel P and not overlapping an emissive area EA thereof, whereby it is possible to prevent deterioration in aperture ratio of the pixel and to improve visibility. For example, each opening OA of the radiation pattern 510 having the mesh pattern structure overlaps the emissive area EA of a corresponding pixel P.

Figure 4:
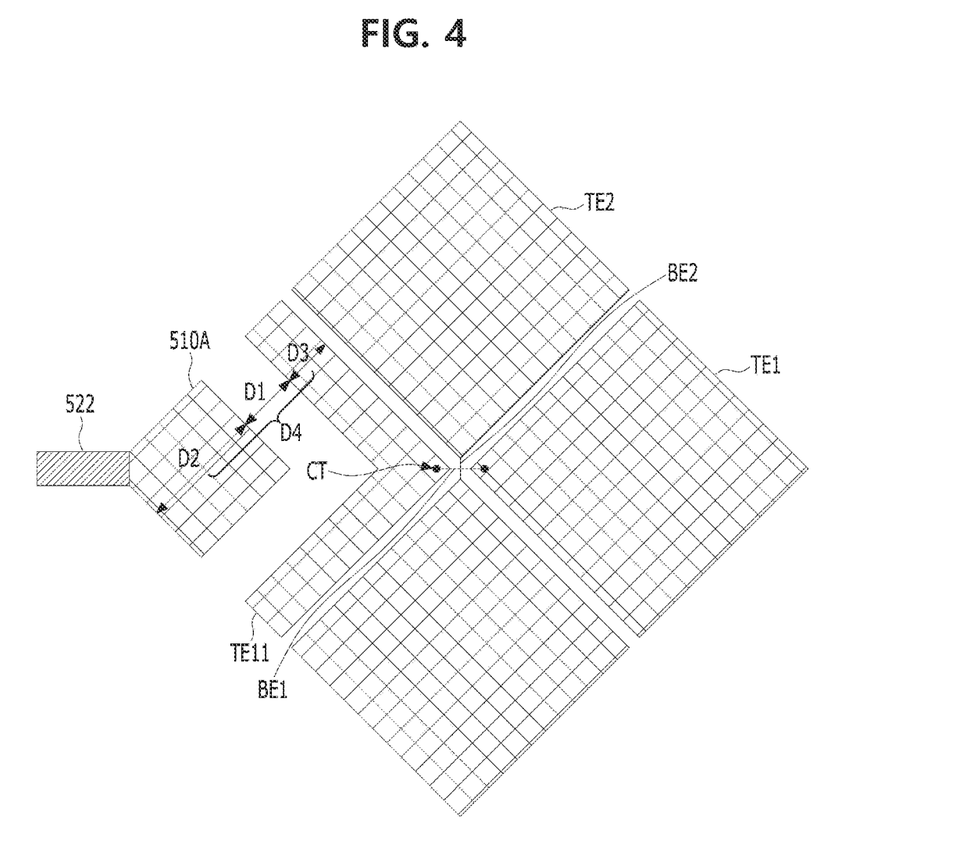
FIG. 4 is an enlarged plan view of the antenna pattern and a touch electrode according to an embodiment.
Figure 5:
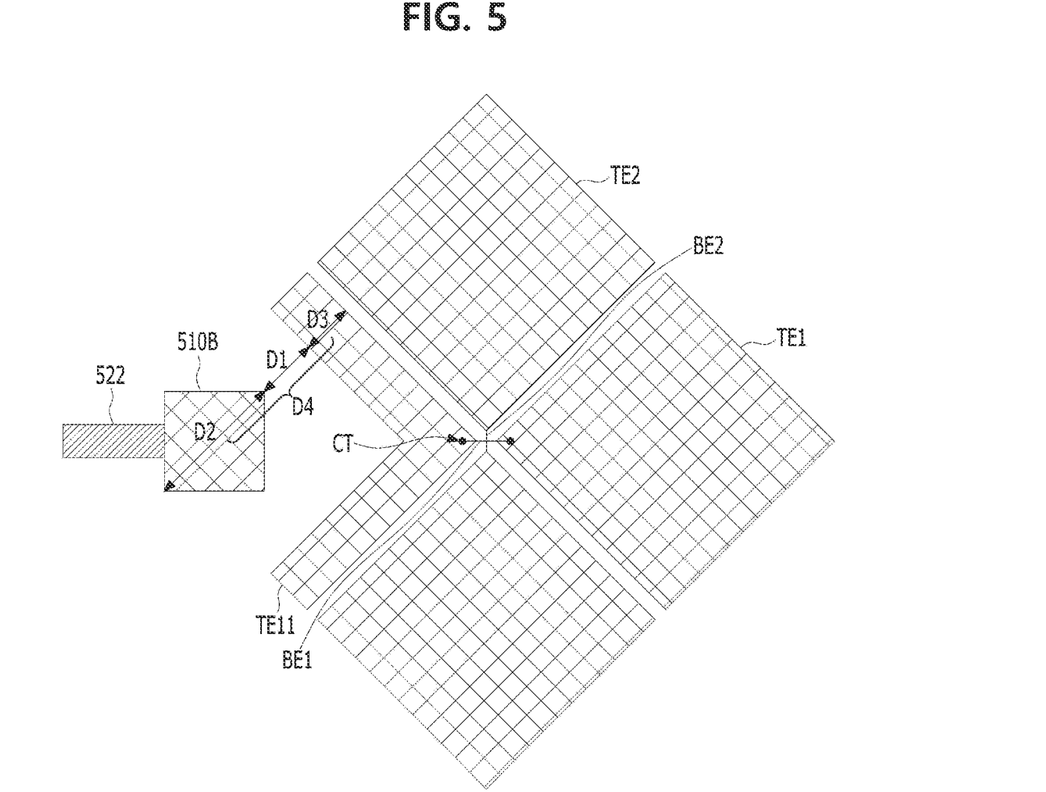
FIG. 5 is an enlarged plan view of the antenna pattern and the touch electrode according to the embodiment.

Referring to FIGS. 4 and 5, the radiation pattern 510 can be formed in a quadrangular shape having edges that are parallel or are not parallel to the different-shaped touch electrode TE11. As shown in FIG. 4, two edges of the radiation pattern 510A can be opposite two edges of the different-shaped touch electrode TE11 while being parallel thereto. As shown in FIG. 5, three edges of the radiation pattern 510B can be opposite two edges of the different-shaped touch electrode TE11 although not being parallel thereto.

In order to prevent deterioration in wireless communication performance, the minimum distance D1 between the radiation pattern 510 and the different-shaped touch electrode TE11 must be or should be 550 μm or more, and is preferably less than the diagonal length D4 of each of the touch electrodes TE1 and TE2 in order to realize a narrow bezel. For example, in the case in which the pitch of a pixel P is 33 μm, the radiation pattern 510 and the different-shaped touch electrode TE11 can be disposed in the state in which a minimum of 17 pixels is located therebetween. The minimum distance D1 between the radiation pattern 510 and the different-shaped touch electrode TE11 can be similar to or greater than the width D3 of the different-shaped touch electrode TE11.

In order to prevent deterioration in wireless communication performance, the diagonal length D2 of the radiation pattern 510 or the distance D2 between opposite sides thereof is preferably greater than the distance D1 and the width D3 of the different-shaped touch electrode TE11, and is preferably less than the diagonal length D4 of each of the touch electrodes TE1 and TE2 in order to realize a narrow bezel.

The feeding unit 520 disposed in the bezel area BZ1 on the touch sensor unit can include a supply line 524 disposed in the Y-axis direction and a plurality of connection portions 522 extending from the supply line 524 in the X-axis direction so as to be connected respectively to the plurality of radiation patterns 510.

The ground plane 530 in the bezel area BZ1 of the display unit is disposed so as to overlap the radiation patterns 510 and the feeding unit 520 in the state in which a gap sufficient to secure resonance frequency of a wireless signal is provided therebetween. The ground plane 530 can be disposed in the same metal layer as one of a plurality of metal layers belonging to the display unit, and can be disposed on the same metal layer as, for example, a source electrode and a drain electrode of a thin film transistor.

The feeding unit 520 and the ground plane 530 can be connected to a wireless communication circuit via a pad unit or a circuit film bonded thereon.

In the touch display device according to the embodiment, as described above, the patch type antenna is disposed at the edge of the display panel, whereby no additional antenna parts are necessary. Consequently, it is possible to slim the display device and to reduce cost related to parts.

Figure 6:
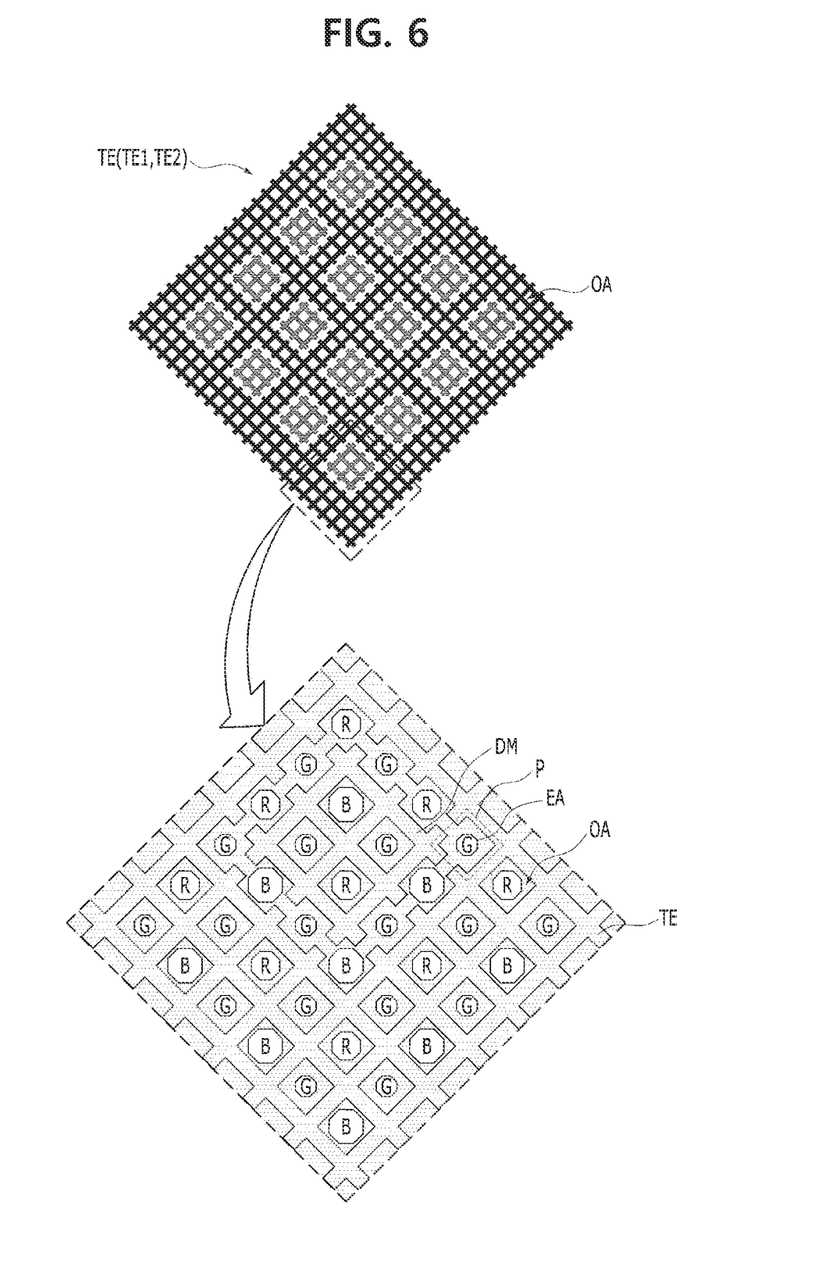
FIG. 6 is an enlarged plan view of the touch electrode according to the embodiment.
Figure 7:
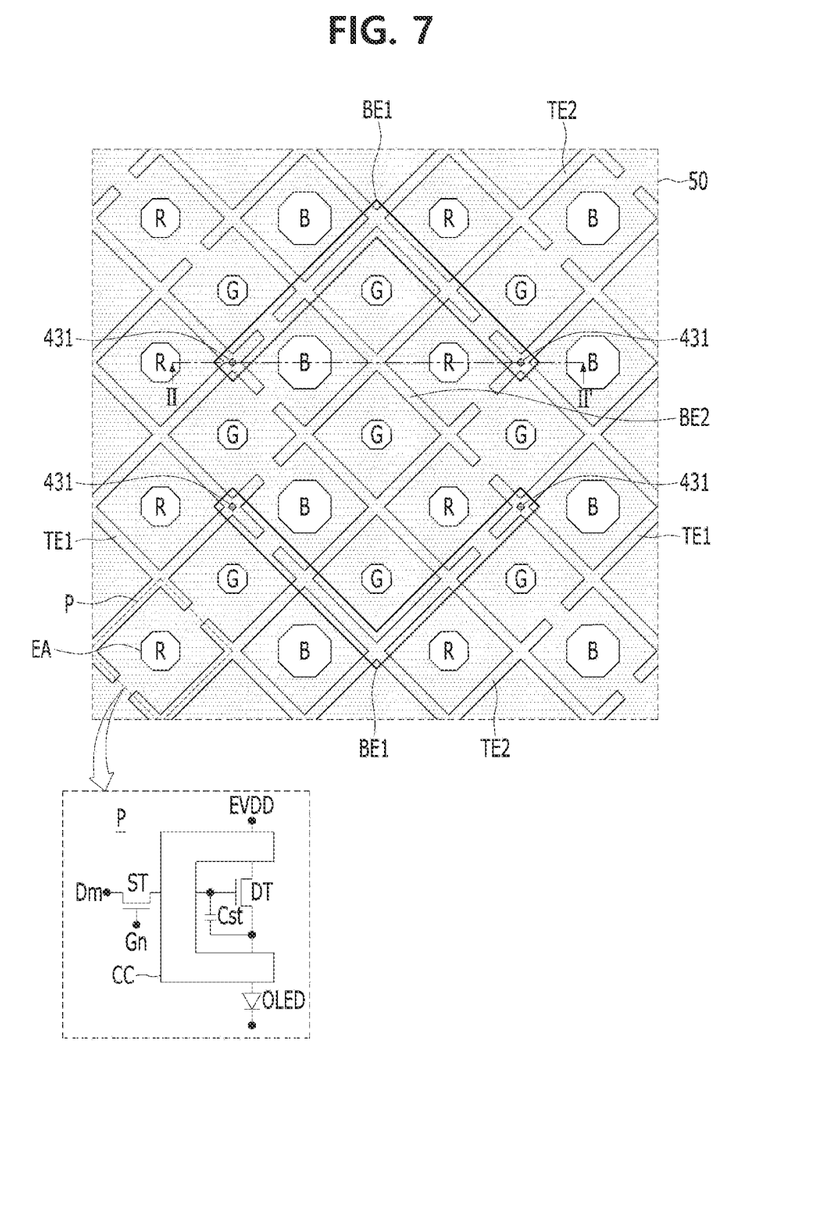
FIG. 7 is an enlarged plan view of a bridge electrode portion according to an embodiment shown in FIG. 1.

FIG. 6 is an enlarged plan view of the touch electrode according to the embodiment, and FIG. 7 is an enlarged plan view of part 50 including bridge electrodes according to an embodiment shown in FIG. 1.

Referring to FIGS. 6 and 7, a touch electrode TE applied to each of the first and second touch electrodes TE1 and TE2 has a diamond shape of a size equivalent to a plurality of pixels P, and has a mesh pattern shape overlapping the non-emissive area of each pixel P. The touch electrode TE can have one of various shapes, such as a quadrangular shape and a circular shape, in addition to the diamond shape. The mesh-pattern-shaped touch electrode TE can have a plurality of openings OA configured to expose the emissive areas EA of the plurality of pixels P, and the plurality of openings OA can be disposed in a matrix. Each of the first and second bridge electrodes BE1 and BE2 also has a line pattern or mesh pattern shape overlapping the non-emissive area of each pixel P. Consequently, the mesh-pattern-shaped touch electrodes TE1 and TE2 and the mesh-pattern-shaped or line-pattern-shaped bridge electrodes BE1 and BE2 are disposed in only the non-emissive areas of the pixels P, whereby it is possible to prevent deterioration in aperture ratio and transmittance of the pixels.

The first and second touch electrodes TE1 and TE2 are constituted by the same sensor metal layers, and are disposed so as to be spaced apart from each other. In the first and second bridge electrodes BE1 and BE2, bridge electrodes of one layer are constituted by the same sensor metal layers as the touch electrodes TE1 and TE2, and bridge electrodes of the other layer are constituted by bridge metal layers different from the touch electrodes TE1 and TE2. For example, a second bridge electrode BE2 interconnecting adjacent second touch electrodes TE2 can be constituted by a sensor metal layer integrated with the second touch electrodes TE2, and can have a mesh pattern shape. A first bridge electrode BE1 interconnecting adjacent first touch electrodes TE1 is constituted by a bridge metal layer having a touch insulating layer therebetween, overlaps a portion of each of the first touch electrodes TE1, and is connected to the first touch electrodes TE1 via a contact hole 431 in the touch insulating layer. The first bridge electrode BE1 can have a line pattern or mesh pattern shape in which the first bridge electrode BE1 partially overlaps the second bridge electrode BE2 or the second touch electrode TE2 in the state in which the touch insulating layer is interposed therebetween while being isolated from each other.

A mesh pattern of each touch electrode TE can further include at least one dummy pattern DM in which the mesh pattern is partially cut so as to electrically float, and the at least one dummy pattern DM can also have a mesh pattern shape. The floating dummy pattern DM can further reduce parasitic capacitance between the touch sensor unit and the display unit overlapping each other in the state in which the encapsulation unit and the touch buffer layer are interposed therebetween in the active area AA, whereby it is possible to improve touch sensing performance. For example, it is possible to reduce parasitic capacitance between the mesh pattern of the touch electrode TE and a common electrode of the light-emitting element layer through the floating dummy pattern DM.

The plurality of pixels P includes red R, green G, and blue B pixels, and can further include a white (W) pixel configured to improve luminance. It is not necessary for the emissive areas EA of the pixels P to have the same area. For example, the emissive areas EA of the pixels P can be smaller in the order of blue B>red R>green G.

Each pixel P includes a light-emitting element OLED disposed in the emissive area EA and a pixel circuit configured to independently drive the light-emitting element OLED, the pixel circuit being disposed over the emissive area EA and the non-emissive area, the pixel circuit including a plurality of TFTs and at least one capacitor.

The pixel circuit at least includes a storage capacitor Cst configured to store drive voltage, a drive TFT DT configured to supply current from a high-potential power line EVDD to the light-emitting element OLED while controlling the amount of current depending on the drive voltage stored in the storage capacitor Cst, and a switching TFT ST configured to provide a data signal of a data line Dm to the storage capacitor Cst in response to a gate signal of a gate line Gn. In addition, the pixel circuit can further include a control circuit CC constituted by a plurality of TFTs configured to initialize three electrodes (gate, source, and drain) of the drive TFT DT, to connect the drive TFT DT in a diamond structure in order to compensate for threshold voltage, or to control light-emission time of the light-emitting element OLED. A first electrode (anode) of the light-emitting element OLED can be connected to the drive TFT DT, and a second electrode (cathode) can be connected to a common electrode which is shared by a plurality of pixels and to which low-potential power voltage EVSS is supplied. Various constructions, such as 2T1C (two TFTs and one capacitor), 3T1C (three TFTs and one capacitor), and 7T1C (seven TFTs and one capacitor), can be applied to the pixel circuit.

Figure 8:
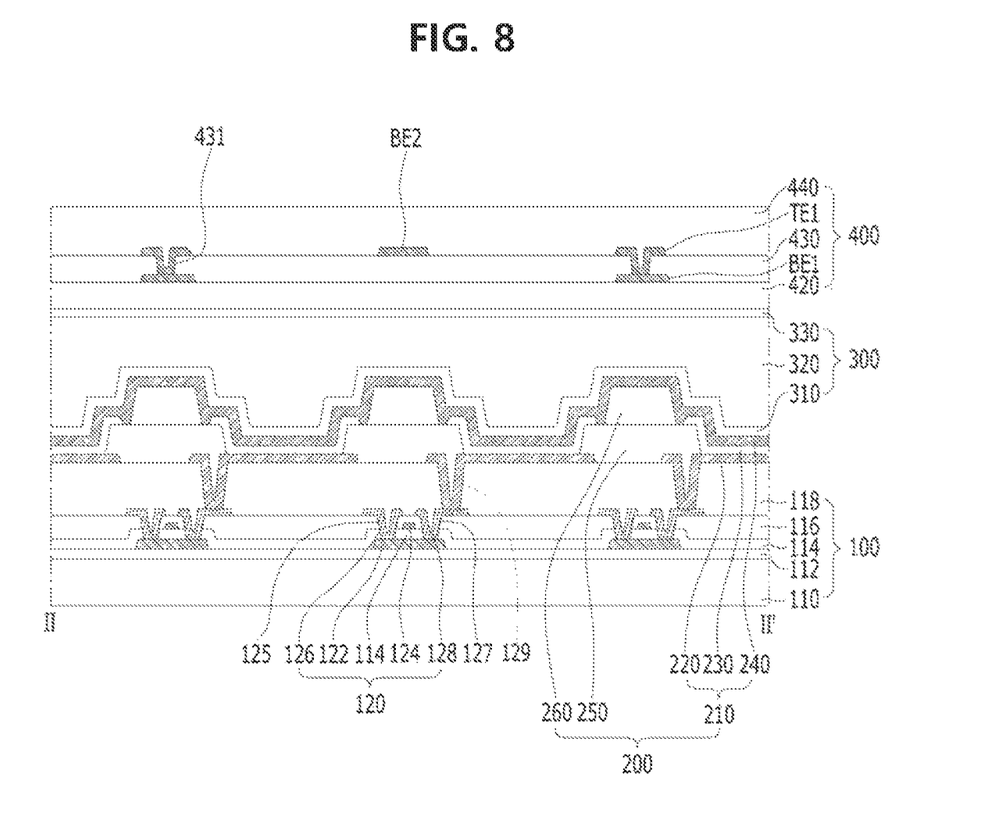
FIG. 8 is a sectional view of the touch display device according to the embodiment taken along the dot-long dash line II-II' of FIG. 7.
Figure 9:
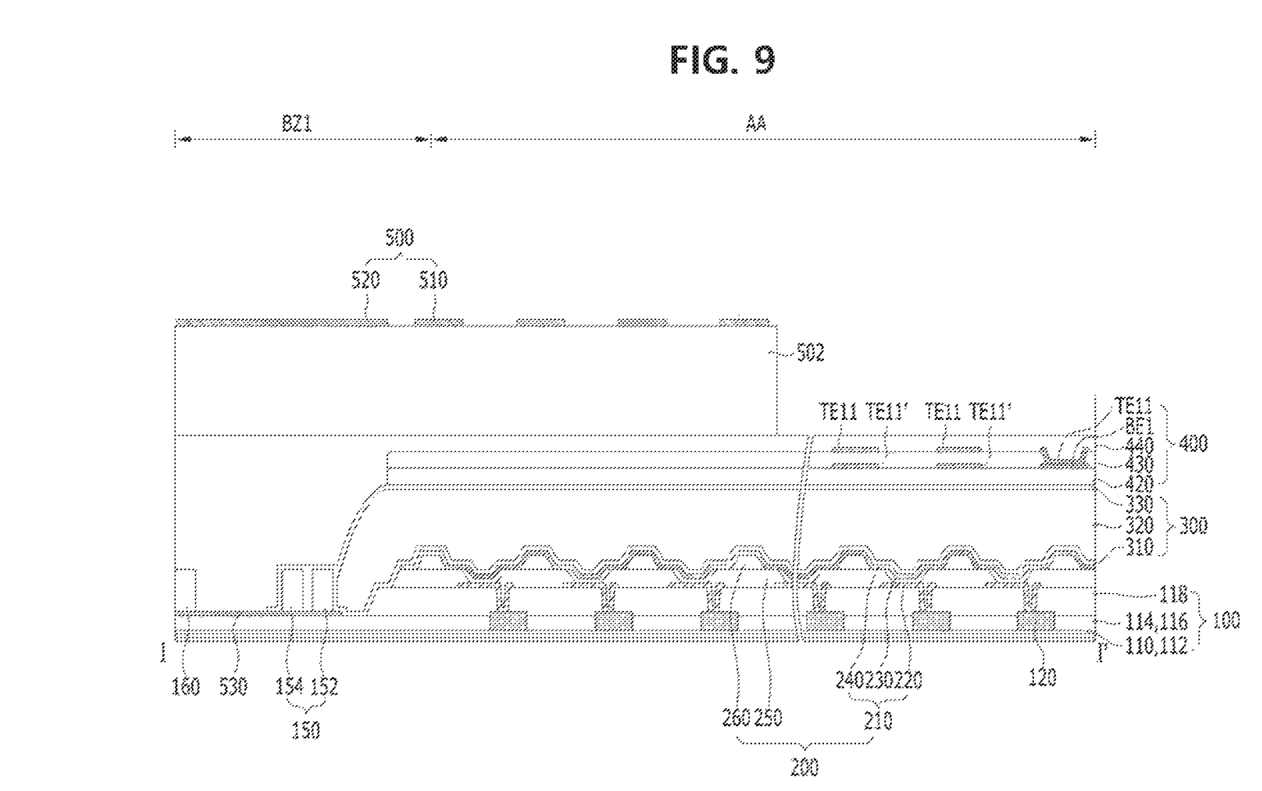
FIG. 9 is a sectional view of the touch display device according to the embodiment taken along the dot-long dash line I-I' of FIG. 1.
Figure 10:
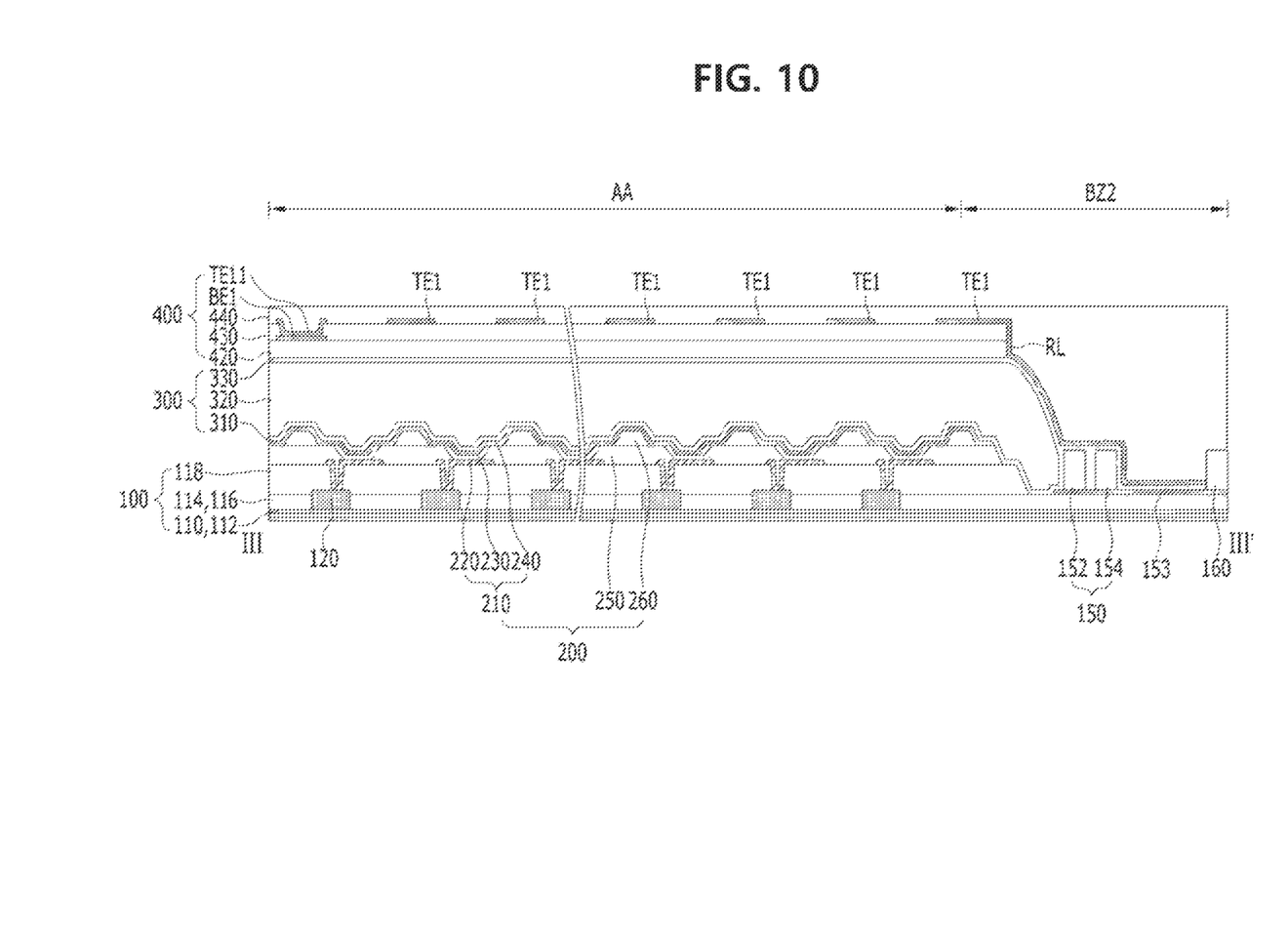
FIG. 10 is a sectional view of the touch display device according to the embodiment taken along the dot-long dash line III-III' of FIG. 1.

FIG. 8 is a sectional view of the touch display device according to the embodiment taken along the dot-long dash line II-II' of FIG. 7, FIG. 9 is a sectional view of the touch display device according to the embodiment taken along the dot-long dash line I-I' of FIG. 1, and FIG. 10 is a sectional view of the touch display device according to the embodiment taken along the dot-long dash line III-III' of FIG. 1.

Referring to FIGS. 8 to 10, the touch display device includes a circuit element layer 100 including a plurality of TFTs 120, a light-emitting element layer 200 including a plurality of light-emitting elements 210 disposed on the circuit element layer 100, an encapsulation unit 300 disposed on the light-emitting element layer 200 so as to seal the light-emitting element layer 200, a touch sensor unit 400 including a plurality of touch sensors disposed on the encapsulation unit 300 in the state in which s touch buffer layers 420 is interposed therebetween, and an antenna unit 500 disposed on the touch sensor unit 400.

The circuit element layer 100 includes a plurality of TFTs 120 disposed on a base substrate 110, the plurality of TFTs 120 is included in each pixel in the active area AA, and a drive circuit, such as a gate drive unit, disposed in the bezel area BZ can be further included. The circuit element layer 100 further includes a plurality of wires connected to the plurality of TFTs 120 and a storage capacitor. However, FIGS. 8 to 10 typically show a drive TFT 120 connected to a light emitting element 210 in each pixel P.

The base substrate 110 can include a plastic substrate or a glass substrate. The plastic substrate can be formed of a flexible material. For example, the base substrate 110 can include at least one of an acrylic-based resin, an epoxy-based resin, a siloxane-based rein, a polyimide-based resin, and a polyamide-based resin, which is an organic insulating material.

A buffer layer 112 can be disposed between the base substrate 110 and the plurality of TFTs 120. The buffer layer 112 can prevent impurities, such as hydrogen, from being introduced into a semiconductor layer 122 of the TFT 120 through the base substrate 110. The buffer layer 112 can include an organic insulating material or an inorganic insulating material. For example, the buffer layer 112 can include an oxide-based insulating material, such as silicon oxide (SiOx) or aluminum oxide ($Al_2O_3$). Meanwhile, a barrier layer capable of preventing introduction of foreign matter can be further disposed between the base substrate 110 and the buffer layer 112. The buffer layer 112 and the barrier layer are disposed in the active area AA and the bezel area BZ.

Each of the plurality of TFTs 120 includes a semiconductor layer 122, a gate insulating layer 114, a gate electrode 124, an interlayer insulating layer 116, a first electrode 126, and a second electrode 128. One of the first electrode 126 and the second electrode 128 can be a source electrode, and the other can be a drain electrode.

The gate electrode 124, the first electrode 126, and the second electrode 128 of each TFT 120 can be formed in a single layer structure or a multilayer structure including one or an alloy of at least two of molybdenum (Mo), aluminum (Al), chromium (Cr), gold (Au), titanium (Ti), nickel (Ni), copper (Cu), neodymium (Nd), and tungsten (W).

The semiconductor layer 122 can be formed of one of an amorphous semiconductor material, a polycrystalline semiconductor material, and an oxide semiconductor material. Meanwhile, the drive TFT 120, which is one of the TFTs belonging to each pixel P, can include a polycrystalline semiconductor layer, and each of the other TFTs can include an oxide semiconductor layer.

Each of the gate insulating layer 114 and the interlayer insulating layer 116 can be formed in a single layer structure or a multilayer structure including at least one of an oxide-based insulating material and a nitride-based insulating material. The gate insulating layer 114 and the interlayer insulating layer 116 can be disposed in the active area AA and the bezel area BZ.

The gate electrode 124 is disposed on the gate insulating layer 114, which covers the semiconductor layer 122, so as to overlap the semiconductor layer 122. The first electrode 126 and the second electrode 128 formed on the interlayer insulating layer 116, which covers the gate electrode 124, are connected to the semiconductor layer 122 via contact holes 125 and 127 formed in the interlayer insulating layer 116 and the gate insulating layer 114.

A light-shielding layer overlapping the semiconductor layer 122 to prevent external light from being incident on the semiconductor layer 122 can be further provided between the buffer layer 112 and the semiconductor layer 122. The light-shielding layer can be formed of a conductive material, and can serve as a lower gate electrode, which is one of dual gate electrodes overlapping the semiconductor layer 122 above and under the semiconductor layer 122.

The circuit element layer 100 further includes a planarization layer 118 configured to cover the TFT 120 and to provide a flat surface to the light-emitting element layer 200, and at least one insulating layer can be further disposed between the TFT 120 and the planarization layer 118. The planarization layer 118 has a contact hole 129, through which the second electrode 128 of the TFT 120 is exposed. The planarization layer 118 can be formed of an organic insulating material, and the organic insulating material can include one of the above organic insulating materials. The planarization layer 118 can be disposed in the active area AA, and can extend to some of the bezel areas BZ1 to BZ4 adjacent to the active area AA. Also, in the case in which the lower bezel area BZ4 including the pad area, which is one of the bezel areas BZ1 to BZ4, is bent, the planarization layer 118 can be further disposed in the bent bezel area so as to overlap wires, whereby it is possible to reduce bending stress applied to the wires and to prevent open-circuit defects.

A light-emitting element layer 200 including a light-emitting element 210 and a bank 250 is formed on the planarization layer 118. The light-emitting element layer 200 can further include a spacer disposed on the bank 250. The light-emitting element layer 200 is disposed in the active area AA, and the bank 250 can extend to a portion of the bezel area BZ.

The light-emitting element 210 can include a first electrode 220 connected to the TFT 120, a light-emitting stack 230, and a second electrode 240. One of the first electrode 220 and the second electrode 240 can be an anode, and the other can be a cathode. The first electrode 220 can be independently separated and disposed for each pixel P, and the second electrode 240 can be a common electrode that is commonly disposed in the plurality of pixels P and is connected along the surfaces of the bank 250 and the spacer.

The first electrode 220 is disposed on the planarization layer 118, and is connected to the second electrode 128 of the TFT 120 via the contact hole 129 formed through the planarization layer 118. The first electrode 220 can be formed in a structure including a plurality of conductive layers exhibiting high reflectance. For example, the first electrode 220 can be formed in a stack structure (Ti/Al/Ti) of aluminum (Al) and titanium (Ti), a stack structure (ITO/Al/ITO) of aluminum (Al) and indium tin oxide (ITO), or a stack structure (ITO/APC/ITO) of APC and ITO. APC is an alloy of silver (Ag), palladium (Pd), and copper (Cu).

A bank 250 which has an opening configured to expose the first electrode 220 and is configured to cover the end of the first electrode 220 is disposed on the planarization layer 118 having the first electrode 220 formed thereon. The opening of the bank 250 can be defined as an emissive area, and the area in which the bank 250 is disposed can be defined as a non-emissive area. The bank 250, which surrounds the emissive area, can be formed in a single layer structure or a double layer structure. A spacer having an opening wider than the opening of the bank 250 can be further disposed on the bank 250. The spacer can support a deposition mask when a light-emitting layer of the light-emitting stack 230 is formed. Each of the bank 250 and the spacer can be formed of the above organic insulating material. The bank 250 includes a light-shielding material, whereby it is possible to prevent backlight bleeding between adjacent pixels and to inhibit reflection of external light.

The light-emitting stack 230 can be formed by stacking a hole control layer, a light-emitting layer, and an electron control layer in that order or in reverse order. The hole control layer and the electron control layer are common layers that are commonly formed in the plurality of pixels P, and the light-emitting layer can be independently formed in the emissive area of each pixel P. The hole control layer can include at least a hole transport layer selected from between a hole injection layer and the hole transport layer, and the electron control layer can include at least an electron transport layer selected from between the electron transport layer and an electron injection layer. The light-emitting layer can generate one of red light, green light, and blue light, and can be formed in the emissive area of a corresponding pixel P through an opening of a fine metal mask (FMM), which is a deposition mask. The light-emitting layer 234 overlapping the first electrode 220 can be disposed so as to overlap the end of the bank 250.

Meanwhile, the light-emitting stack 230 can include a plurality of light-emitting stacks overlapping in the state in which a charge generation layer is interposed therebetween to generate white light, and the plurality of light-emitting stacks can be formed as a common layer that is commonly formed in the plurality of pixels P. A color filter layer configured to emit each of red light, green light, and blue light using white light can be further provided in an optical path along which white light is emitted from the light-emitting stack 230. The color filter layer can include a color filter overlapping the emissive area of each pixel P and a black matrix overlapping the non-emissive area, and can be disposed above or under the touch sensor unit 400. The color filter and the black matrix can absorb external light, whereby it is possible to inhibit reflection of external light and to improve external visibility.

The second electrode 240 is disposed on the light-emitting stack 230, and is also disposed on the bank 250 and the spacer, whereby the second electrode 240 can also be referred to a common electrode that is commonly formed in the plurality of pixels P. The second electrode 240 can be formed of a conductive material having high light transmittance or a semi-transmissive conductive material. For example, the second electrode 240 can be formed of a transparent conductive material, such as ITO or IZO. The second electrode 240 can be formed of a semi-transmissive metal material, such as magnesium (Mg), silver (Ag), or an alloy thereof. A capping layer can be further disposed on the second electrode 240 in order to improve light resonance and light emission efficiency of the light-emitting element 210. The second electrode 240 can be disposed over the entire active area AA, and can extend to the bezel area BZ so as to be connected to a power supply line disposed on another layer in the bezel area BZ.

The encapsulation unit 300 configured to seal the light-emitting element layer 200 can be disposed on the light-emitting element layer 200, whereby it is possible to prevent moisture or oxygen from permeating into the light-emitting element layer 200 and to prevent introduction or movement of foreign matter. The encapsulation unit 300 can have a stack structure in which n inorganic encapsulation layers 310 and 330 (n being an integer equal to or greater than 2) and (n−1) organic encapsulation layers 320 are alternately disposed. The inorganic encapsulation layers 310 and 330 can prevent permeation of external moisture or oxygen. The organic encapsulation layer 320 can serve to prevent introduction or movement of foreign matter and to alleviate stress between layers when the display panel is bent.

Before the encapsulation unit 300 is formed, a dam unit 150 formed of the same insulating material in the same layer as at least one insulating layer of the display unit is further disposed in the bezel area BZ of the display unit. The dam unit 150 can prevent the liquid organic encapsulation layer 320 from spreading to the edge of the panel at the time of an inkjet process and to prevent the liquid organic encapsulation layer from spreading to the pad area of the lower bezel area BZ4. The dam unit 150 can be disposed in the bezel areas BZ1 to BZ4 so as to be spaced apart from the active area AA in order to surround the active area AA, and can overlap the encapsulation unit 300 disposed thereon.

The dam unit 150 can include a plurality of dams 152 and 154 disposed in the bezel areas BZ1 to BZ4 so as to be spaced apart from each other, and can further include a dam 160 located at the end of the panel. The plurality of dams 152, 154, and 160 can have the same height or different heights. For example, the height of the second dam 154, which is disposed outside, can be greater than the height of the first dam 152, which is disposed inside, and the outermost third dam 160 can have the same height as the first dam 152. The plurality of dams 152, 154, and 160 can be disposed on the insulating layers 112, 114, and 116 of the circuit element layer 100, can overlap a power supply line of the circuit element layer 100 disposed in the bezel areas BZ1 to BZ4, and can overlap the ground plane 530. The plurality of dams 152, 154, and 160 can be formed of the same insulating material in the same layer as at least one of the planarization layer 118, the bank 250, and the spacer, and can be formed in a single layer structure or a multiple stack structure thereof.

The encapsulation unit 300 has a stack structure in which the organic encapsulation layer 320 is disposed between the upper and lower inorganic encapsulation layers 310 and 330. The plurality of inorganic encapsulation layers 310 and 330 can be disposed in the active area AA, and can extend to the bezel area BZ so as to cover the dam unit 150. The organic encapsulation layer 320 can be disposed in the active area AA, and can extend to the bezel area BZ so as not to overlap the dam unit 150 or to partially overlap the first dam 152 disposed inside. The inorganic encapsulation layers 310 and 330 are formed in a structure configured to entirely wrap the upper surface, the lower surface, and the side surface of the organic encapsulation layer 320, and contact each other at the edges of the bezel area BZ1 to BZ4 that does not overlap the organic encapsulation layer 320.

Each of the plurality of inorganic encapsulation layers 310 and 330 is formed of an inorganic insulating material that can be processed in a low-temperature process, and the organic encapsulation layer 320 is formed of an organic insulating material that can be processed in the low-temperature process. The inorganic insulating material can include one of silicon nitride, silicon oxide, silicon oxynitride, and aluminum oxide. The organic insulating material can include one of the above-described organic insulating materials.

The touch sensor unit 400 includes a touch buffer layer 420, a bridge metal layer, a touch insulating layer 430, a sensor metal layer, and a touch passivation layer 440, which are sequentially stacked on the encapsulation unit 300. The touch buffer layer 420 can be omitted.

Each metal layer constituting the touch sensor unit 400 and the antenna unit 500 can be formed of an opaque metal material that exhibits high corrosion resistance, acid resistance, and conductivity, and can have a single layer structure or a multilayer structure. For example, each metal layer of the touch sensor unit 400 can be formed in a single layer structure or a multilayer structure including at least one of molybdenum (Mo), aluminum (Al), chromium (Cr), gold (Au), titanium (Ti), nickel (Ni), copper (Cu), neodymium (Nd), tungsten (W), and an alloy thereof. Each metal layer of the touch sensor unit 400 can be formed in a structure in which three metal layers are stacked, such as Ti/Al/Ti, Mo/Al/Mo, MoTi/Cu/MoTi, or Ti/Al/Mo.

Each of the touch buffer layer 420, the touch insulating layer 430, and the touch passivation layer 440 can be formed of an insulating material that can be processed in the low-temperature process. Each of the touch buffer layer 420 and the touch insulating layer 430 can be formed of an inorganic insulating material or an organic insulating material. The touch passivation layer 440 configured to protect the sensor metal layer can provide a flat surface, and can be formed of one of an acrylic-based organic insulating material, a polyimide-based organic insulating material, and a siloxane-based organic insulating material, which are photocurable organic insulating materials that can be processed in the low-temperature process.

The bridge metal layer located between the touch buffer layer 420 and the touch insulating layer 430 includes a plurality of bridge electrodes BE1 disposed in the active area AA and a lower touch electrode TE11' of a different-shaped touch electrode.

The sensor metal layer located between the touch insulating layer 430 and the touch passivation layer 440 can include touch electrodes TE1 and TE2, an upper touch electrode TE11, and a bridge electrode BE2 disposed in the active area AA, and can include touch routing lines RL1 and RL2 disposed in the bezel areas BZ2 and BZ4 and an upper pad of the touch pad T-PD disposed in the pad area of the bezel area BZ4. The sensor metal layer can further include an upper pad of the display pad D-PD disposed in the pad area of the bezel area BZ4.

Meanwhile, a lower pad of the display pad D-PD can be formed of the same metal layer as the first and second electrodes such as source and drain electrodes 126 and 128 belonging to the display unit, and the upper pad and the lower pad can be connected to each other via a contact hole formed in at least one insulating layer between the upper pad and the lower pad.

The first touch electrode TE1 is connected to the first bridge electrode BE1 via the contact hole 431 formed in the touch insulating layer 430, and is connected to another first touch electrode TE1 adjacent thereto via the first bridge electrode BE1 and another contact hole 431. The upper touch electrode TE11 is connected to the lower touch electrode TE11' via the contact hole 431.

The touch routing lines RL1 and RL2 connected to one of the first and second touch electrodes TE1 and TE2 can be disposed along the end profile of the encapsulation unit 300. Meanwhile, the touch routing lines RL1 and RL2 can be formed in a dual wiring structure in which the upper and lower routing lines overlapping each other in the state in which the touch insulating layer 430 is interposed therebetween are connected to each other via the contact hole in the touch insulating layer 430. The upper routing line can be formed as a sensor metal layer, and the lower routing line can be formed as a bridge metal layer.

The touch passivation layer 440 configured to cover the sensor metal layer is disposed on the touch insulating layer 430. The touch passivation layer 440 can protect the touch sensor unit 400, and can provide a flat surface to upper layers, such as an optical film attached to the touch sensor unit 400 and the antenna unit 500. The touch passivation layer 440 can be disposed in the active area AA and the bezel area BZ, but is not disposed in the pad area, in which the pads T-PD and D-PD are located, for connection with the drive unit.

The radiation patterns 510 and the feeding unit 520 of the antenna unit 500 are disposed on the touch passivation layer 440 of the touch sensor unit 400 in the state in which a planarization layer 502 is interposed therebetween.

The planarization layer 502 is disposed on the touch passivation layer 440 in the bezel area BZ1, in which the antenna unit 500 is disposed, and a portion of the active area AA. Preferably, the planarization layer 502 is formed of an organic insulating material and has a dielectric constant of 2.2 to 12.

The radiation patterns 510 disposed on the planarization layer 502 do not overlap the different-shaped touch electrodes TE11 but overlap the non-emissive areas of the pixels in the active area AA. The radiation patterns 510 can extend to the bezel area BZ1 adjacent to the active area AA on the planarization layer 502.

The feeding unit 520 is disposed on the planarization layer 502 in the bezel area BZ1, and is formed of the same metal layer as the radiation patterns 510. The feeding unit 520 overlaps the ground plane 530 belonging to the display unit in the state in which the touch passivation layer 440 and the planarization layer 502 are interposed therebetween.

Each of the touch passivation layer 440 and the planarization layer 502 can be formed of an organic insulating material, and can have a large thickness sufficient to secure a resonance frequency of a wireless signal.

For example, in order to provide a resonance frequency of several tens of GHz band currently required for a 5G antenna, a gap between the feeding unit 520 and the ground plane 530 of about 30 μm to 500 μm is necessary, and this gap can be sufficiently secured by the thickness of the touch passivation layer 440 and the planarization layer 502. Furthermore, in the case in which a resonance frequency of several hundred GHz band is provided, the gap between the feeding unit 520 and the ground plane 530 is about 3 μm to 150 μm, and therefore the planarization layer 502 on the touch passivation layer 440 can be omitted.

The ground plane 530 disposed in the bezel area BZ1 of the display unit can be disposed in the same metal layer as one of the plurality of metal layers belonging to the display unit, and can be disposed in the same metal layer as, for example, the first electrodes such as source electrode 126 and the first electrodes such as drain electrode 128 of the thin film transistor 120.

As is apparent from the above description, in the touch display device according to the embodiment(s), the patch type antenna is disposed at the edge of the display panel, whereby no additional antenna parts are necessary. Consequently, it is possible to slim down the display device and reduce costs related to the parts and/or fabrication.

In the touch display device according to the embodiment(s), the radiation patterns and the feeding unit of the antenna unit are disposed on the touch sensor unit in the state in which the planarization layer is interposed therebetween, and the ground plane is disposed in the same layer as any one metal layer of the display unit, whereby it is possible to secure a necessary gap between the radiation patterns and the ground plane. Consequently, it is possible to prevent deterioration in wireless transmission and reception performance. In addition, the mask process is simplified, whereby it is possible to reduce manufacturing cost.

In the touch display device according to the embodiment(s), the radiation patterns of the antenna unit are disposed in the active area on the touch sensor unit, and the mesh-shaped radiation pattern that does not overlap the outermost touch electrode of the channel in the active area and overlaps the non-emissive area of each pixel, whereby it is possible to prevent deterioration in wireless transmission and reception performance, touch sensing performance, and display performance due to the antenna unit mounted therein.

In the touch display device according to the embodiment(s), the outermost different-shaped touch electrode of the channel, the area of which is reduced due to the disposition of the antenna, in the touch sensor unit is formed so as to have a dual structure in which the upper touch electrode and the lower touch electrode overlap each other in the state in which the touch insulating layer is interposed therebetween and are connected to each other via the contact hole in the touch insulating layer in order to reduce resistance. Consequently, it is possible to reduce deviation in RC delay with another touch electrode, whereby it is possible to prevent deterioration in touch sensing performance.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the specific embodiments.

What is claimed is:

1. A touch display device comprising:
a display unit comprising a plurality of pixels disposed in an active area;
an encapsulation unit disposed on the display unit, the encapsulation unit being configured to seal the plurality of pixels;
a touch sensor unit comprising a plurality of touch sensors disposed on the encapsulation unit;
an antenna pattern disposed at an edge on the touch sensor unit in a state in which a planarization layer is interposed therebetween, the antenna pattern not overlapping a touch electrode and a touch routing line included in the touch sensor unit; and
a ground plane disposed in an identical layer to any one metal layer belonging to the display unit, the ground plane overlapping the antenna pattern,
wherein the antenna pattern comprises:
a plurality of radiation patterns disposed in the active area on the planarization layer so as to be spaced apart from the touch electrode by a minimum distance; and
a feeding unit disposed on the planarization layer in a bezel area adjacent to the active area, the feeding unit being commonly connected to the plurality of radiation patterns, and
the feeding unit overlaps the ground plane disposed in the bezel area in the display unit.

2. The touch display device according to claim 1, wherein the touch sensor unit comprises a plurality of touch electrodes disposed in the active area,
a touch electrode adjacent to the antenna pattern, among the plurality of touch electrodes, is a different-shaped touch electrode having a different shape from other touch electrodes, and
the different-shaped touch electrode comprises an upper touch electrode and a lower touch electrode connected to each other via a contact hole.

3. The touch display device according to claim 2, wherein each of the plurality of radiation patterns has a mesh pattern shape overlapping non-emissive areas of the plurality of pixels in the active area of the display unit.

4. The touch display device according to claim 2, wherein the plurality of radiation patterns are individually spaced apart from a plurality of different-shaped touch electrodes adjacent to the bezel area in the active area.

5. A touch display device comprising:
a display unit comprising a plurality of pixels disposed in an active area;
an encapsulation unit disposed on the display unit, the encapsulation unit being configured to seal the plurality of pixels;
a touch sensor unit comprising a plurality of touch sensors disposed on the encapsulation unit:
an antenna pattern disposed at an edge on the touch sensor unit in a state in which a planarization layer is interposed therebetween, the antenna pattern not overlapping a touch electrode and a touch routing line included in the touch sensor unit; and
a ground plane disposed in an identical layer to any one metal layer belonging to the display unit, the ground plane overlapping the antenna pattern,
wherein the planarization layer is disposed only between the touch sensor unit and the antenna pattern.

6. The touch display device according to claim 2, wherein the touch sensor unit comprises a touch buffer layer, a bridge metal layer, a touch insulating layer, a sensor metal layer, and a touch passivation layer sequentially stacked on the encapsulation unit,
the sensor metal layer comprises first and second touch electrodes constituting each touch sensor, a second bridge electrode configured to interconnect adjacent second touch electrodes, the upper touch electrode of the different-shaped touch electrode, and a plurality of touch routing lines connected to the first and second touch electrodes,
the bridge metal layer comprises a first bridge electrode configured to interconnect adjacent first touch electrodes and the lower touch electrode of the different-shaped touch electrode,
the first bridge electrode partially overlaps the second touch electrode or the second bridge electrode in a state in which the touch insulating layer is interposed therebetween, and
the first touch electrode, the second touch electrode, the different-shaped touch electrode, and at least one of the first bridge electrode and the second bridge electrode have a mesh pattern shape overlapping the non-emissive areas of the plurality of pixels.

7. The touch display device according to claim 6, wherein the plurality of touch routing lines are disposed in bezel areas other than a bezel area in which the antenna pattern is located.

8. The touch display device according to claim 6, wherein a plurality of insulating layers at least comprising the touch passivation layer and the planarization layer are located between the ground plane and the antenna pattern in the bezel area.

9. The touch display device according to claim 6, wherein the upper and lower touch electrodes are connected to each other via a contact hole formed in the touch insulating layer, and
the lower touch electrode is connected to the first bridge electrode.

10. The touch display device according to claim 3, wherein each of the plurality of radiation patterns comprises at least two edges opposite two edges of the different-shaped touch electrode, and
the at least two edges of each of the plurality of radiation patterns are disposed so as to be parallel to or so as not to be parallel to the two edges of the different-shaped touch electrode.

11. The touch display device according to claim 10, wherein a minimum distance between each of the plurality of radiation patterns and the different-shaped touch electrode is approximately 550 μm or more, and is less than a diagonal length of each of other touch electrodes.

12. The touch display device according to claim 11, wherein a width of each of the plurality of radiation patterns is greater than the minimum distance, and is greater than a width of the different-shaped touch electrode.

* * * * *